United States Patent
Ostrowski et al.

(10) Patent No.: US 6,775,098 B2
(45) Date of Patent: Aug. 10, 2004

(54) MAGNETIC RECORDING HEAD WITH DIELECTRIC LAYER SEPARATING MAGNETIC POLE TIPS EXTENSIONS FROM THE ZERO THROAT COIL INSULATOR

(75) Inventors: Mark Ostrowski, Lakeville, MN (US); Shouxiang Hu, Silver Spring, MD (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 09/872,774

(22) Filed: Jun. 1, 2001

(65) Prior Publication Data

US 2002/0048117 A1 Apr. 25, 2002

Related U.S. Application Data

(60) Provisional application No. 60/209,014, filed on Jun. 1, 2000.

(51) Int. Cl.[7] ............................................... G11B 5/147
(52) U.S. Cl. ...................................................... 360/126
(58) Field of Search ................................ 360/126, 125, 360/119

(56) References Cited

U.S. PATENT DOCUMENTS

| 4,199,415 A | 4/1980 | Sterling et al. | 205/118 |
|---|---|---|---|
| 4,486,273 A | 12/1984 | Lutfy et al. | 205/126 |
| 4,818,349 A | 4/1989 | Smith | 205/128 |
| 4,877,644 A | 10/1989 | Wu et al. | 427/556 |
| 5,652,687 A | 7/1997 | Chen et al. | 360/126 |
| 6,018,862 A | 2/2000 | Stageberg et al. | 29/603.14 |
| 6,055,138 A | 4/2000 | Shi | 360/120 |
| 6,154,345 A | * 11/2000 | Ishiwata et al. | 360/317 |

FOREIGN PATENT DOCUMENTS

| JP | 11-120510 | 4/1999 |
|---|---|---|
| JP | 11-312303 | 11/1999 |
| JP | 11-312304 | 11/1999 |
| JP | 11-353616 | 12/1999 |
| JP | 2000-11319 | 1/2000 |

* cited by examiner

*Primary Examiner*—David Davis
(74) *Attorney, Agent, or Firm*—Moser, Patterson & Sheridan, LLP; Keith P. Taboada

(57) ABSTRACT

A magnetic recording head includes a zero throat formed on a bottom pole layer and a dielectric layer formed over a portion of the bottom pole layer and over a portion of the zero throat. A bottom pole extension, a gap layer, and a top pole extension are plated in a pole tip region of the recording head so that the dielectric layer separates the plated layers in the pole tip region from the zero throat. The dielectric layer reduces the magnetic flux leakage between a bottom pole extension and a top pole extension of the recording head.

14 Claims, 4 Drawing Sheets

MAGNETIC RECORDING HEAD WITH DIELECTRIC LAYER SEPARATING MAGNETIC POLE TIPS EXTENSIONS FROM THE ZERO THROAT COIL INSULATOR

CROSS-REFERENCE TO RELATED APPLICATION(S)

This application claims the benefit of provisional application No. 60/209,014 filed on Jun. 1, 2000, entitled "Self-Aligned Selective Multiple Layer Plating Process."

TECHNICAL FIELD

This invention relates to improved magnetic recording heads. More particularly, the invention relates to magnetic recording heads with a dielectric layer, and to methods for utilizing this layer to reduce magnetic flux leakage in the recording head.

BACKGROUND

Magnetic recording heads are commonly used to record data to a magnetic data storage medium, such as a computer hard drive. A computer hard drive uses at least one disc coated with magnetic material and a recording head suspended over the surface of the disc. The surface of the recording head that is substantially parallel to the surface of the disc is known as an air bearing surface. The recording head has a pair of opposing poles, known as a top pole and a bottom pole, that are made of a magnetic material. The poles are separated by a nonmagnetic gap layer in a region near the air bearing surface known as the pole tip region. The recording head includes at least one inductive coil that generates magnetic flux through the top pole and the bottom pole. A magnetic field is formed across the gap layer at the air bearing surface to record data to the disc.

A portion of the magnetic flux generated by the inductive coil is often transmitted between the top and bottom poles in a region outside the pole tip region. The leakage of magnetic flux in the recording head impacts the magnetic field at the air bearing surface, and may degrade the performance of the recording head.

A cross-sectional view of a conventional magnetic recording head 3 is shown in FIG. 1. The conventional recording head 3 has a bottom pole layer 10 of a magnetic material, such as permalloy. The bottom pole layer 10 may serve as a magnetic shield layer for a magnetoresistive sensor (not shown in FIG. 1), in which case the bottom pole layer 10 is known as a shared pole layer 10. To insulate the inductive coils 26 of the recording head 3 from the magnetic material of the bottom pole layer 10, a zero throat 20 is formed on a selected region 15 of the bottom pole layer 10. The zero throat 20 provides a base 25 on which the inductive coils 26 may be formed. The zero throat 20 is typically made of a nonconductive material, such as a cured photoresist material. The inductive coils 26 are surrounded by insulative material 27, such as a cured photoresist material, that is formed over the zero throat 20.

A bottom pole extension 40, a gap layer 50 and a top pole extension 60 are formed in succession on the bottom pole layer 10. The bottom pole extension 40 is plated over a selected portion 11 of the bottom pole layer 10 not overlain by the zero throat 20. The gap layer 50, which is made of a nonmagnetic material such as PdNi (Palladium nickel), is plated over the bottom pole extension 40. Both the bottom pole extension 40 and the gap layer 50 extend from an air bearing surface 80 and overlie a region 23 on the zero throat 20. The top pole extension 60 is plated over the gap layer 50 and also extends from the air bearing surface 80 and overlies the region 23 of the zero throat 20. A top pole layer 70 is formed over a portion 63 of the top pole extension 60 and the insulation layer 27 that surrounds the inductive coils 26.

To write data to the magnetic media, the inductive coils 26 generate magnetic flux, and a magnetic field is formed between the top pole extension 60 and the bottom pole extension 40 at the air bearing surface 80.

Referring to FIG. 2, to make the magnetic recording head 3 of FIG. 1, an optional seed layer 12 may be deposited over an exposed region 11 of the bottom pole layer 10 that is not overlain by the zero throat 20, as well as over a surface 21 of the zero throat 20. The seed layer 12 is a thin layer of magnetic material that provides a base for plating additional layers. After the seed layer 12 is deposited, the bottom pole extension 40, the gap layer 50 and the top pole layer 60 are electroplated in a pole tip region 14, as well as over the region 23 of the zero throat 20. Subsequently, the gap layer 50 is plated over the bottom pole extension 40, and the top pole extension 60 is plated over the gap layer 50. After the top pole layer 70 is deposited (FIG. 1), a lapping process may be used to form the air bearing surface 80 of the recording head 3.

SUMMARY

Referring to FIGS. 1–2, the magnetic flux generated by the inductive coils 26 should completely and uninterruptedly transmit in a path between the bottom pole extension 40 and the top pole extension 60 at the air bearing surface 80. However, since the bottom pole extension 40 and the gap layer 50 are plated over the region 23 of the zero throat 20, some of the magnetic flux is lost in a flux leakage region 16 between the bottom pole extension 40 and the top pole extension 60. The flux leakage region 16 is located at the interface between the overlapping areas of the layers 40, 50, and 60 over the region 23 of the zero throat 20. The magnetic flux at the air bearing surface 80 is essential to the writing capabilities of the recording head, and the loss of magnetic flux in the flux leakage region 16 (FIG. 2) may degrade the performance of the recording head.

In general, the invention is directed to improved recording heads with reduced magnetic flux leakage, and methods for their manufacture.

In one embodiment, the invention is a magnetic recording head including a zero throat formed over a region of a bottom pole layer, a pole tip region with a bottom pole extension and a gap layer, and a dielectric layer that separates the zero throat from the bottom pole extension and the gap layer. The dielectric layer reduces the magnetic flux leakage of the magnetic recording head.

In a second embodiment, the invention is a magnetic recording head including a zero throat formed over a region of a bottom pole layer, a bottom pole extension, a top pole extension, and a means for reducing overlapping area between the bottom pole extension and the top pole extension over the zero throat.

In a third embodiment, the invention is a method of manufacturing a magnetic recording head including forming a zero throat on a bottom pole layer; forming a dielectric layer over a portion of the bottom pole layer and over a portion of the zero throat; and plating a first layer on the bottom pole layer to in a pole tip region. The dielectric layer separates the first layer in the pole tip region from the zero throat.

In a fourth embodiment, the invention is a method for selective multi-layer plating including depositing a dielectric material over a region of a seed layer, masking a pattern over the seed layer and the dielectric material, plating at least one plated layer in the seed layer region, removing at least a portion of the dielectric material to form an exposed area of the seed layer; and plating over the plated layer and the exposed area of the seed layer.

The dielectric layer occupies an area over the zero throat in the magnetic flux leakage region that otherwise may be occupied by the components of the pole tip region, such as the bottom pole extension, the gap layer, and the top pole extension. The dielectric layer prevents the bottom pole extension and gap layer from contacting the zero throat, so the magnetic flux loss in the flux leakage region may be reduced or substantially eliminated. In addition, the dielectric layer may be used in combination with a photoresist pattern during the manufacturing process to more precisely control the plating of the bottom pole extension, the gap layer, and the top pole extension using a self-aligned selective plating process.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 3A:
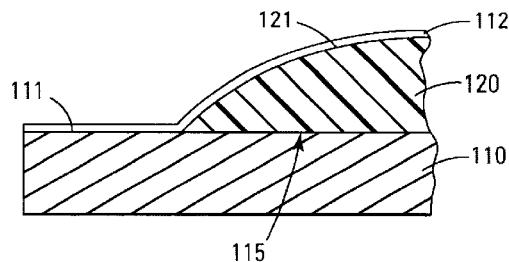
FIGS. 3A–E are cross-sectional views of a process for manufacturing the magnetic recording head of the invention.

FIGS. 3A–E illustrate a process for manufacturing a portion of a recording head 105 of the invention. Referring to FIG. 3A, a zero throat 120 is formed on a selected portion 115 of a bottom pole layer 110. An optional seed layer 112 may be then deposited over the exposed surfaces 111 and 121 of the bottom pole layer 110 and the zero throat 120, respectively.

Figure 3B:
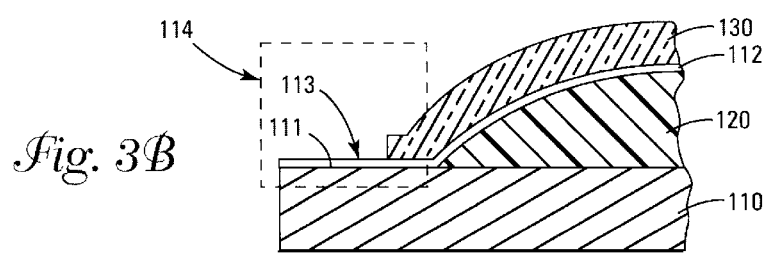

As shown in FIG. 3B, a dielectric layer 130 is then deposited on the seed layer 112 over the bottom pole layer 110 and the zero throat 120. A portion of the dielectric layer 130 is then removed to expose a region 113 of the seed layer 112 in a pole tip region 114. The dielectric layer 130 may be made of any dielectric material. Suitable dielectric materials include, for example, metal oxides such as aluminum oxide ($Al_2O_3$) or $SiO_2$. The dielectric layer 130 may be deposited by any conventional means and subsequently removed from the region 113 using, for example, a photo-defined etch mask and a HF (hydrofluoric) etching process.

Figure 3C:
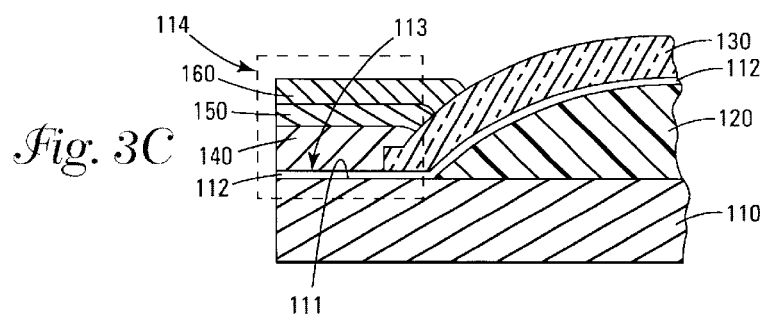

Referring to FIG. 3C, a bottom pole extension 140 is plated over the region 113, and a gap layer 150, and a top pole extension 160 are subsequently plated over the bottom pole extension 140. The bottom pole extension 140, the gap layer 150, and the top pole extension 160 are preferably plated using a self-aligned selective plating process in which the sidewalls of these layers are aligned with an appropriately shaped photoresist pattern. Although the photoresist pattern may not cover the zero throat 120, the bottom pole extension 140 and the gap layer 150, and the top pole extension 160 do not plate onto the zero throat 120 due to the presence of the dielectric layer 130. The dielectric layer 130, which acts as an additional masking element, allows selective plating of the bottom pole extension 140, the gap layer 150 and the top pole extension 160 in the pole tip region 114 away from the zero throat 120.

Figure 3D:
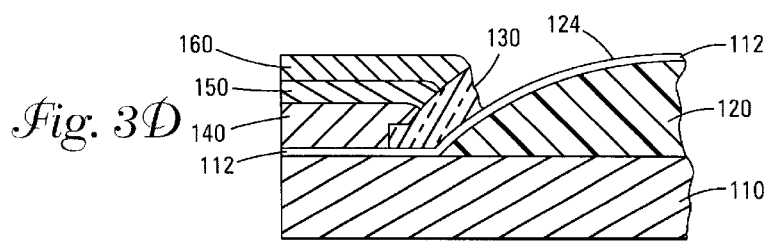

Referring to FIG. 3D, after the top pole extension 160 is plated over the gap layer 150, the portion of the dielectric layer 130 that is not covered by the top pole extension 160 is removed to expose a surface 124 of the seed layer 112 over the zero throat 120. The portion of the dielectric layer 130 that is removed to expose the surface 124 may be removed using an etching process without the need to apply an etch mask since the portion of the dielectric layer 130 that remains is already masked by the top pole extension 160.

Figure 3E:
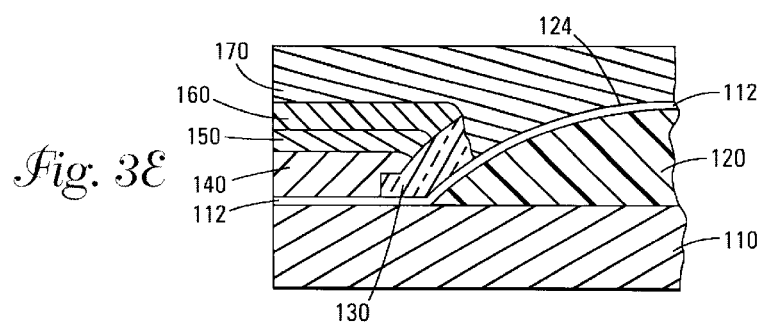

Referring to FIG. 3E, using the previously mentioned photoresist pattern, a top pole layer 170 is plated over the top pole extension 160 and the exposed surface 124 of the seed layer 112 that overlies the zero throat 120. After the top pole layer 170 is formed to the desired thickness, the patterned photoresist used to shape the bottom pole extension 140, the gap layer 150, the top pole extension 160, and the top pole layer 170 is removed and an encapsulation layer 190 (not shown in FIG. 3E) may be formed over the recording head 105.

Figure 1:
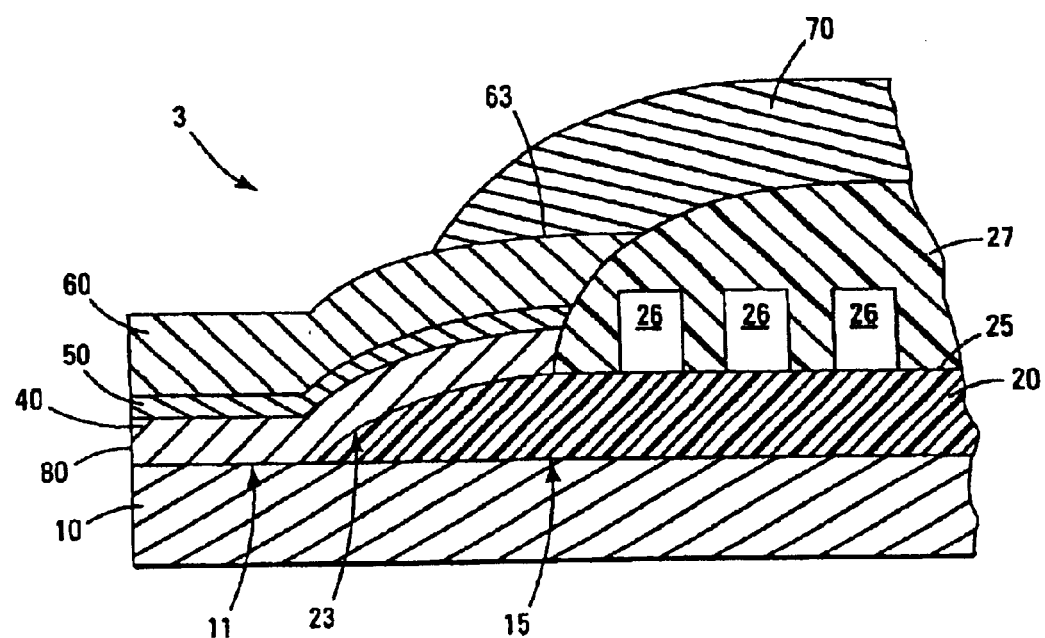
FIG. 1 is a cross-sectional view of a conventional magnetic recording head.
Figure 2:
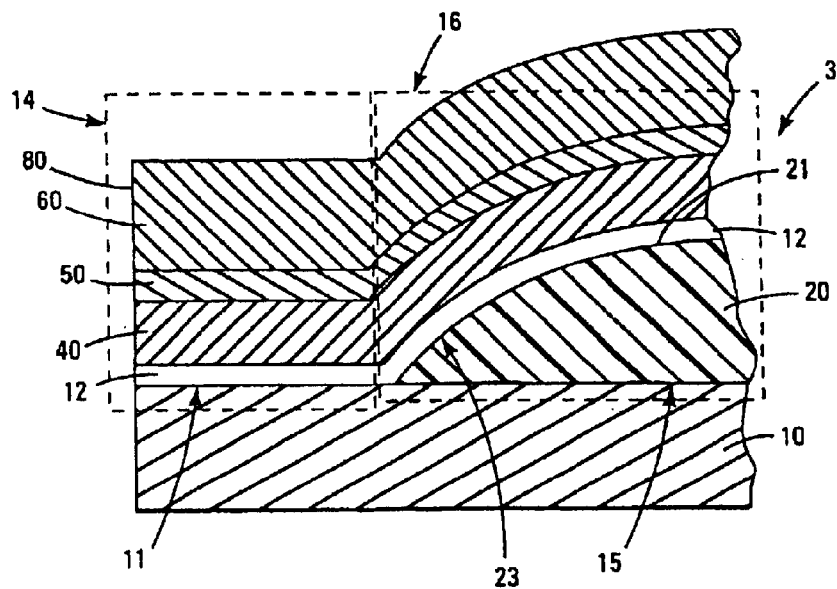
FIG. 2 is a cross-sectional view of the zero throat from the conventional magnetic recording head of FIG. 1.
Figure 4:
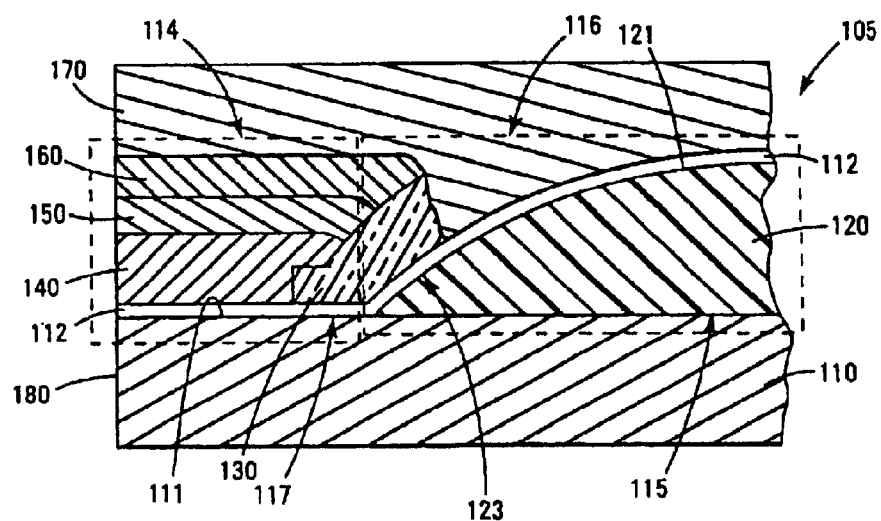
FIG. 4 is a cross-sectional view of the zero throat of a magnetic recording of the invention.

Referring to FIG. 4, a recording head 105 of the invention includes a zero throat 120 formed on a selected portion 115 of the bottom pole layer 110 to provide an insulated region where the inductive coils (not shown in FIG. 4) may be formed. An optional seed layer 112 may be deposited on an exposed surface 111 and 121 of the bottom pole layer 110 and the zero throat 120, respectively. A layer 130 of a dielectric material is formed over a portion 117 of the bottom pole layer 110 and over a portion 123 of the zero throat 120. The dimensions of the dielectric layer 130 may vary depending on the thickness of the bottom pole extension 140 and the gap layer 150 as required for a particular application, but the length and thickness of the layer 130 should be selected to prevent contact between the layers 140, 150, and 160 in the pole tip region 114 and the zero throat 120 and thereby reduce flux losses in the flux leakage region 116. Thus, in this embodiment of the invention the dielectric layer 130 separates the zero throat 20 from the bottom pole extension 140, the gap layer 150 and the top pole extension 160 so that the bottom pole extension 140 and the gap layer 150 are not plated in the flux leakage region 116.

Figure 5:
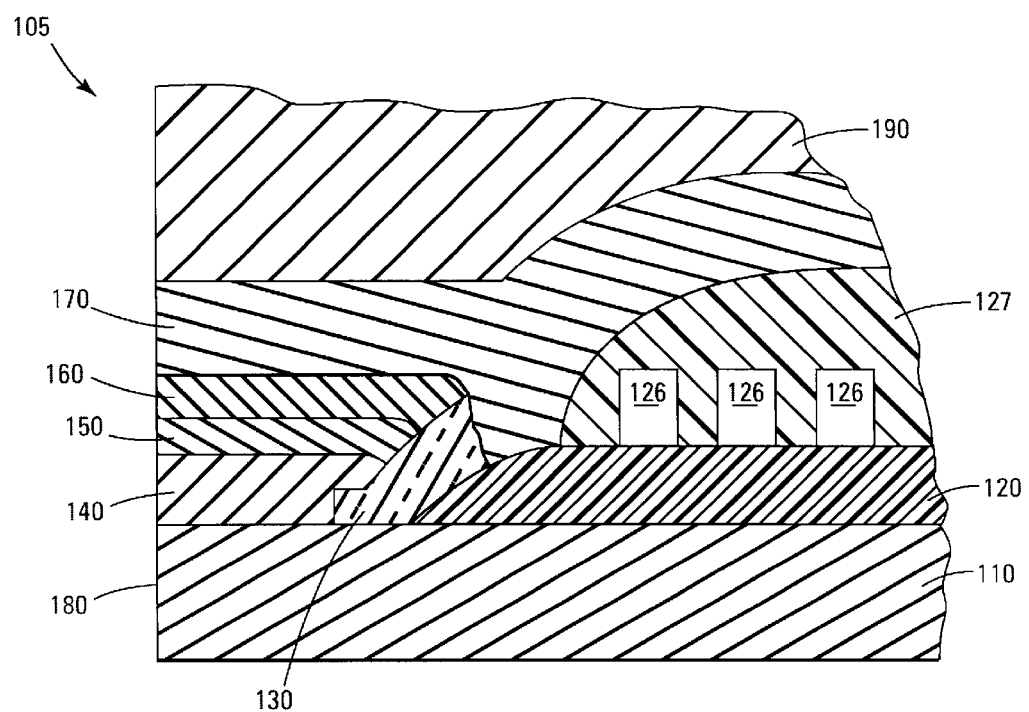
FIG. 5 is a cross-sectional view of the magnetic recording head of FIG. 4.

Referring again to FIGS. 4–5, the top pole layer 170 extends over the top pole extension 160 and the insulator layer 127, and an encapsulation layer 190 may be formed over the top pole layer 170. Since the dielectric layer 130 reduces the overlapping area between the bottom pole extension 140 and the top pole extension 160 over the zero throat 120, the magnetic flux leakage in the magnetic recording head 5 may be minimized.

A number of embodiments of the invention have been described. Nevertheless, it will be understood that various modifications may be made without departing from the spirit and scope of the invention.

For example, a portion of the dielectric layer 130 may be removed to expose a surface 124 of the seed layer 112 after the gap layer 150 is plated, instead of after the top pole extension 160 is plated (FIG. 3D). In this embodiment, the bottom pole extension 140 and the gap layer 150 are separated from the zero throat 120 by the dielectric layer 130, but there the top pole extension may not be necessary. After the portion of the dielectric layer is removed to expose the surface 124, the top pole layer 170 may be plated directly over the gap layer 150 and the exposed surface 124 of the seed layer 112 that overlies the zero throat 120.

The dielectric layer may be employed as a masking element in any selective multi-layer plating process. For example, if the dielectric material is deposited over a specified region of a layer, a pattern may be masked over the layer and the dielectric material. At least one plated layer may be deposited on the layer by removing the dielectric material to form an etched dielectric area; and plating over the plated layer and the etched dielectric area.

Accordingly, other embodiments are within the scope of the following claims.

What is claimed is:

1. A magnetic recording head comprising a zero throat formed over a region of a bottom pole layer and spaced from an air bearing surface, a pole tip region terminating on one edge on said air bearing surface on an a second edge near said zero throat comprising a bottom pole extension and a gap layer, and a dielectric layer spaced from said air bearing surface that separates the zero throat from the bottom pole extension and gap layer, wherein the dielectric layer reduces the magnetic flux leakage of the magnetic recording head.

2. The magnetic recording head of claim 1, further comprising a top pole extension plated over the gap layer such that the gap layer is between the bottom pole extension and the top pole extension.

3. The magnetic recording head of claim 2, wherein the dielectric layer is formed over a portion of the zero throat so as to reduce overlapping area between the bottom pole extension and the top pole extension over the zero throat.

4. The magnetic recording head of claim 1, wherein the dielectric layer is made of a material selected from the group consisting of metal oxides and cured photoresist.

5. The magnetic recording head of claim 4, wherein the dielectric layer is a metal oxide selected from the group consisting of $Al_2O_3$ and $iO_2$.

6. The magnetic recording head of claim 1, further comprising a seed layer between the zero throat and the dielectric layer.

7. A magnetic recording head comprising:

a bottom pole layer;

a zero throat formed over a first region of the bottom pole layer;

a gap layer disposed on the bottom pole layer extending laterally away from the zero throat to an air bearing surface; and a dielectric layer isolating the gap layer from the zero throat.

8. The magnetic recording head of claim 7, further comprising a top pole extension layer disposed over the gap layer and separated from the zero throat by the dielectric layer such that the gap layer is between the bottom pole layer and the top pole extension layer.

9. The magnetic recording head of claim 8 further comprising a top pole extension layer disposed between the top pole layer and the gap layer, the top pole extension layer separated from the zero throat by the dielectric layer.

10. The magnetic recording head of claim 9, wherein the top pole layer contacts the dielectric layer, the zero throat and the top pole extension layer.

11. The magnetic recording head of claim 9 further comprising a seed layer having a first side disposed on the bottom pole layer and the zero throat, and a second side having the dielectric layer, a bottom pole extension layer and top pole layer disposed thereon, wherein the bottom pole extension layer is disposed between the bottom pole layer and the gap layer.

12. The magnetic recording head of claim 7, wherein the dielectric layer is spaced from the air bearing surface.

13. The magnetic recording head of claim 7, wherein the dielectric layer is made of at least one material selected from the group consisting of metal oxides and cured photoresist.

14. The magnetic recording head of claim 7 further comprising a bottom pole extension layer disposed between the bottom pole layer and the gap layer.

* * * * *